(12) United States Patent
Kuntze et al.

(10) Patent No.: US 10,065,572 B2
(45) Date of Patent: Sep. 4, 2018

(54) DISPLAY DEVICE FOR A MOTOR VEHICLE, HAVING A FORCE SENSOR, A MOTOR VEHICLE, AND A METHOD

(71) Applicant: VALEO Schalter und Sensoren GmbH, Bietigheim-Bissingen (DE)

(72) Inventors: Daniel Kuntze, Bietigheim-Bissingen (DE); Lars Schoch, Bietigheim-Bissingen (DE); Karl Simonis, Bietigheim-Bissingen (DE)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/534,240

(22) PCT Filed: Dec. 9, 2015

(86) PCT No.: PCT/EP2015/079086
§ 371 (c)(1),
(2) Date: Jun. 8, 2017

(87) PCT Pub. No.: WO2016/091931
PCT Pub. Date: Jun. 16, 2016

(65) Prior Publication Data
US 2017/0341593 A1 Nov. 30, 2017

(30) Foreign Application Priority Data
Dec. 11, 2014 (DE) .................. 10 2014 118 380

(51) Int. Cl.
*G02B 27/12* (2006.01)
*B60R 11/02* (2006.01)
(Continued)

(52) U.S. Cl.
CPC ...... *B60R 11/0229* (2013.01); *G02B 27/0149* (2013.01); *G03B 21/28* (2013.01);
(Continued)

(58) Field of Classification Search
CPC .................................................. B60R 11/0229
(Continued)

(56) References Cited

U.S. PATENT DOCUMENTS

| 7,978,414 B2 | 7/2011 | Potakowskyj et al. |
| 2009/0008344 A1 | 1/2009 | Jin et al. |
| 2014/0320382 A1* | 10/2014 | Moussa .............. G02B 27/0149 345/7 |

FOREIGN PATENT DOCUMENTS

| DE | 3137351 A1 | 4/1983 |
| DE | 4337059 A1 | 5/1995 |

(Continued)

OTHER PUBLICATIONS

International Search Report issued in corresponding application No. PCT/EP2015/079086 dated Mar. 22, 2016 (4 pages).
(Continued)

*Primary Examiner* — James Jones
(74) *Attorney, Agent, or Firm* — Osha Liang LLP

(57) ABSTRACT

The invention relates to a display device (2) for a motor vehicle (1) having a mirror apparatus (13) which has a display element (7) with a semi-transparent mirror surface, and having a drive apparatus (15) by means of which the mirror apparatus (13) can be moved between a storage position and a position of use, wherein the mirror apparatus (13) has a sensor apparatus (22) which is configured to detect, in the position of use of the mirror apparatus (13), a force applied to the display element (7).

14 Claims, 4 Drawing Sheets

(51) Int. Cl.
    *G02B 27/01*        (2006.01)
    *G03B 21/28*        (2006.01)
    *G03B 21/30*        (2006.01)
    *G03B 21/62*        (2014.01)
    *G09G 3/00*         (2006.01)

(52) U.S. Cl.
    CPC ............. *G03B 21/30* (2013.01); *G03B 21/62* (2013.01); *G09G 3/002* (2013.01)

(58) Field of Classification Search
    USPC ........................................................ 359/630
    See application file for complete search history.

(56) References Cited

FOREIGN PATENT DOCUMENTS

| DE | 102005048192 A1 | 4/2007 |
| --- | --- | --- |
| EP | 2479598 A1 | 7/2012 |
| JP | H11-91403 A | 4/1999 |

OTHER PUBLICATIONS

Written Opinion of the International Searching Authority issued in corresponding application No. PCT/EP2015/079086 dated Mar. 22, 2016 (5 pages).

German Search Report issued in corresponding application No. 10 2014 118 380.0 dated Dec. 11, 2014 (10 pages).

\* cited by examiner

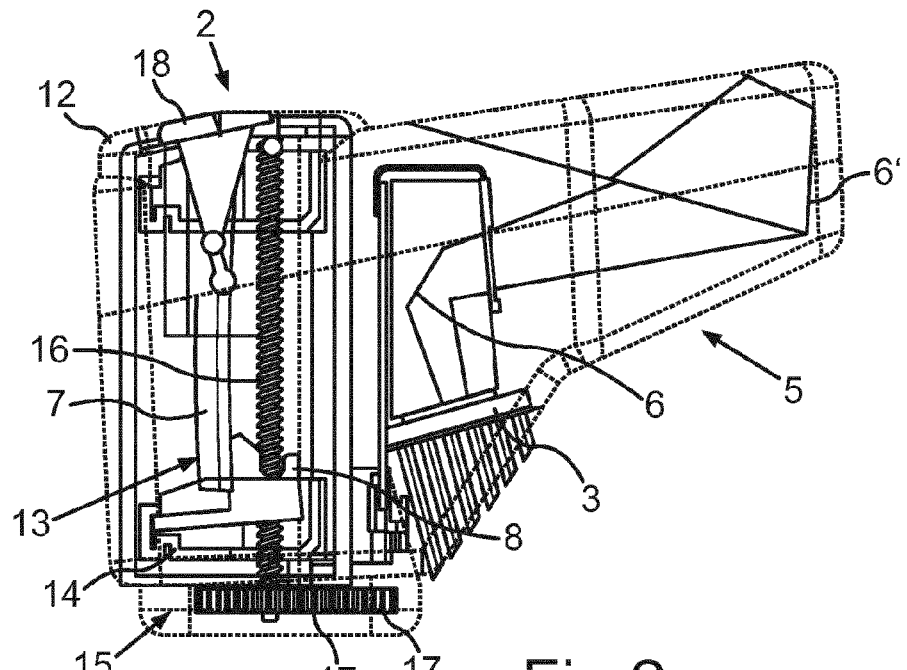
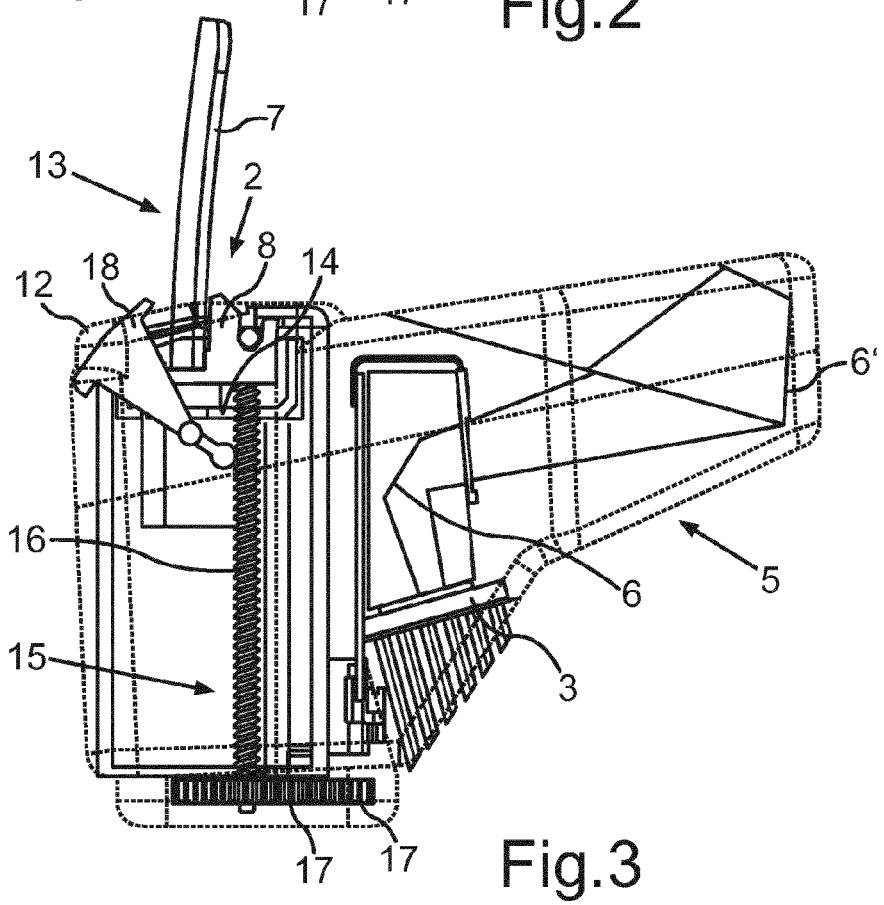

DISPLAY DEVICE FOR A MOTOR VEHICLE, HAVING A FORCE SENSOR, A MOTOR VEHICLE, AND A METHOD

The present invention relates to a display device for a motor vehicle having a mirror apparatus which has a display element with a semi-transparent mirror surface, and having a drive apparatus by means of which the mirror apparatus can be moved between a storage position and a position of use. The invention also relates to a motor vehicle having such a display device. Finally, the present invention relates to a method for operating a display device for a motor vehicle.

At present there is interest in display devices for motor vehicles which are embodied as head-up display devices. Such a display device usually comprises an image-generating device with which light can be emitted. In addition, the display device comprises an optical apparatus which can comprise, for example, one or more mirrors. With the optical apparatus the light which is emitted by the image-generating apparatus can be projected onto a display element. The display element has a semi-transparent mirror surface. This semi-transparent mirror surface can be made available, for example, by means of an area of the windscreen of the motor vehicle. In addition, display devices are known which have a separate display element. Such display elements can also be referred to as a combiner, combiner mirror or combiner screen. A virtual image or a virtual display can be made available by superimposing of the information which is projected onto the display element, and is reflected thereby, with information which shines through the display element from the surroundings behind the display element.

In display devices which have a separate display element or a combiner mirror there is usually a drive apparatus provided by means of which the display element can be moved between a storage position and a position of use. In the storage position, the display element can be arranged, for example, inside a housing of the display device. In the position of use, the display element can be arranged at least partially outside the housing. In display devices which have a separate display element or a combiner mirror, it is necessary to ensure that incorrect activation is detected so that destruction of the display element and of the drive apparatus or of the kinematics located behind them is prevented.

In this respect, U.S. Pat. No. 7,978,414 B2 describes a positioning system for a combiner of a head-up display. The positioning system is arranged on a frame which has a base plate. In addition, a moveable carrier for holding the combiner is provided within the frame. The carrier can be moved between a first end of the frame, at which the combiner is arranged in a storage position, and a second end of the frame, at which the combiner is arranged in a completely extended position.

Furthermore, EP 2 479 598 A1 describes a positioning system for a head-up display which comprises a carrier which can be moved between a storage position or a position of use by means of a movement mechanism. In addition, a combiner is arranged on the carrier. An angle of inclination of the combiner can be set using an angle adjustment mechanism. The movement of the combiner or of the angle of inclination of the combiner can be optionally set with a drive mechanism.

The object of the present invention is to indicate a solution as to how a display device of the type mentioned in the beginning, in particular a head-up display device can be operated more reliably.

This object is achieved according to the invention by means of a display device, by means of a motor vehicle and by means of a method having the features according to the respective independent patent claims. Advantageous embodiments of the invention are subject matter of the dependent patent claims, of the description and of the figures.

A display device according to the invention for a motor vehicle comprises a mirror apparatus which has a display element with a semi-transparent mirror surface. Furthermore, the display device comprises a drive apparatus by means of which the mirror apparatus can be moved between a storage position and a position of use. In addition, the mirror apparatus comprises a sensor apparatus which is configured to detect, in the position of use of the mirror apparatus, a force applied to the display element.

The display device is embodied, in particular, as what is referred to as a head-up display device. The display device can have an image-generating apparatus with which light can be emitted. In particular, an image can be made available with the image-generating apparatus. The light emitted by the image-generating device can be projected onto the display element of the mirror apparatus using an optical apparatus. The display element has a semi-transparent mirror surface. The display element can be fabricated, for example, from glass or from plastic. The display element can also be referred to as a combiner mirror, combiner screen or as a combiner. Therefore, the light which is projected onto the display element is reflected to the eyes of a driver of the motor vehicle. In addition, the light which shines from a surrounding area behind the display element to the driver through the display element arrives at the driver's eyes. A virtual image or a virtual display is made available to the driver by the superimposition of the light which shines through the display element on the light which is reflected by the display element.

The display device has the mirror apparatus, which in turn comprises the display element. In addition, a drive apparatus is provided by means of which the mirror apparatus can be moved between a storage position and a position of rest and vice versa. The drive apparatus can comprise, for example, a corresponding servomotor. In the position of use, the mirror apparatus is located inside the housing of the display device. In the position of use, the mirror apparatus can be moved out of the housing using the drive apparatus, with the result that in the position of use the display element is arranged at least partially outside the housing.

The mirror apparatus also has a sensor apparatus by means of which a force applied to the display element can be detected. The sensor apparatus is configured to detect the force applied to the display element while the mirror apparatus is located in the position of use. With the sensor apparatus it is possible to detect, in particular, whether a tension or a pressure is applied to the display element. In particular, the sensor apparatus can be configured to detect forces which act on the display element from different spatial directions. For example, a force which is applied to the display element from above can therefore be detected. In addition, forces which are applied to the display element from the front or from the rear can be detected by means of the sensor apparatus. Therefore, incorrect operation of the display device can be reliably detected.

Furthermore, it is advantageous if the sensor apparatus is configured to output a control signal if the detected force exceeds a predetermined threshold value. The sensor apparatus can have, for example, a storage element in which a threshold value for the force is stored. If the force applied to the display element exceeds this threshold value, a corresponding control signal can be output by the sensor apparatus. As a result of the control signal, for example a warning signal can be output. In this context it is conceivable that an acoustic, an optical and/or a haptic warning signal is output to the driver of the motor vehicle. Therefore, the driver can be alerted to the fact that he is operating the display device incorrectly.

In a further refinement, the sensor apparatus is configured to transmit the control signal to the drive apparatus, and the drive apparatus is configured to move the mirror apparatus from the position of use into the storage position after reception of the control signal. If the force acting on the display element exceeds the threshold value, the display element or the combiner mirror can be moved into the storage position by means of the drive apparatus. Therefore, damage to the display element, the drive apparatus and/or the kinematics can be prevented.

In a further embodiment, the sensor apparatus is configured to detect a force applied to the display element during the movement of the mirror apparatus from the storage position into the position of use. In addition, the sensor apparatus can be configured to detect a force applied to the display element during the movement of the mirror apparatus from the position of use into the storage position. Therefore it is possible, for example, to detect that the mirror apparatus sticks during the movement from the storage position into the position of use. In addition, objects which are stored on the display device may prevent the mirror apparatus from being able to be moved from the storage position into the position of use. Such a state can be reliably detected using the sensor apparatus.

In one embodiment the mirror apparatus has a holding element for holding the display element, and the sensor apparatus is arranged at least partially in an intermediate space between the display element and the holding element. In this context, the sensor apparatus can be arranged on the display element. The sensor apparatus can also be arranged on the holding element.

The holding element can at least partially surround the display element. Therefore, a force in the holding region of the holding element can be detected with the sensor apparatus. Forces which are applied to the display element can be detected particularly reliably by means of the relatively large lever which is generated by the display element as a result of the effect of the force on the display element.

In a further refinement, the mirror apparatus has a stamping element which is connected to the drive apparatus and which is coupled to the holding element, wherein the sensor apparatus is arranged at least partially in an intermediate space between the holding element and the carrier element. In this context, in particular the carrier element is fixedly connected to the drive apparatus. The drive apparatus can be embodied, for example, as a spindle drive, wherein a spindle of the drive apparatus is mechanically connected to the carrier element. The holding element can be mechanically connected to the display element or the combiner mirror. The sensor apparatus can be arranged on the holding element and/or on the carrier element. Therefore, an effect of a force on the display element which is mechanically coupled to the holding element can be detected.

In a further embodiment, the mirror apparatus has a spring element, wherein the holding element is mounted with respect to the carrier element by means of the prestressed spring element. In order to compensate for component tolerances and/or mounting tolerances, the mirror apparatus has a spring element. By means of the spring element it is possible to eliminate any play in the mechanism and therefore prevent any generation of noise during the operation of the display device. By using the sensor apparatus it is also possible to detect or derive the spring stress made available by the spring element.

In a further refinement, the display device has a housing, wherein in the storage position the mirror apparatus is arranged inside the housing, and in the position of use it is arranged at least partially outside the housing. In the position of use, the mirror apparatus is located inside the housing of the display device. In the position of use, the mirror apparatus can be moved out of the housing using the drive apparatus, with the result that in the position of use the display element is arranged at least partially outside the housing. In addition, the housing can have a cover element which in a closed position is located in the storage position of the mirror apparatus and in an open position is located in the position of use of the mirror apparatus. The housing can therefore be closed with the cover element when the mirror apparatus is located in the storage position. If the mirror apparatus is moved from the storage position into the position of use, the cover element can be moved from the closed position into the open position. The cover element can be moved from the closed position into the open position and vice versa with the drive apparatus via a corresponding kinematic. The housing protects the mirror apparatus and, in particular the display element against soiling and external influences.

In a further embodiment, the mirror apparatus has a bearing element and the housing element has a counter bearing element which corresponds to the bearing element, wherein in the position of use of the mirror apparatus the bearing element is mounted rotatably with respect to the counter bearing element. When the mirror apparatus moves from the storage position into the position of use, the bearing element of the mirror apparatus runs up onto the counter bearing element of the housing. The bearing element of the mirror apparatus and the corresponding counter bearing element of the housing form together a rotary bearing element. Thus, in the position of use the mirror apparatus can be rotated or tilted. Therefore, the mirror apparatus in the display device arranged in the motor vehicle can be set to an eye position of a driver of the motor vehicle.

In a further refinement, the drive apparatus is configured to rotate the mirror apparatus in the position of use. In the position of use of the mirror apparatus, the bearing element and the corresponding counter bearing element would therefore make available a rotary bearing. If the mirror apparatus is moved further with the drive apparatus after said mirror apparatus reaches the position of use, a rotational movement of the mirror apparatus relative to the housing can be possible. Therefore, with only a single drive apparatus both the movement of the mirror apparatus between the storage position and the position of use and the rotation of the mirror apparatus in the position of use can be made possible. In this context, the bearing element, the counter bearing element and/or the drive apparatus can be embodied in such a way that in the position of use the mirror apparatus can be rotated in the clockwise direction or in the anti-clockwise direction by the drive apparatus. This permits two extension directions for the mirror apparatus with different inclinations. Therefore, the drive apparatus can be adapted technically and mechanically to different installation space conditions by the configuration of the bearing element, of the counter bearing element and/or of the drive apparatus.

The display device preferably has an image-generating apparatus for emitting light and an optical apparatus for projecting the light emitted by the image-generating apparatus onto the display element. The image-generating apparatus can comprise, for example, a corresponding screen with which an image can be generated. The optical apparatus can comprise one or more mirrors by means of which the light can be projected onto the display element.

In a further embodiment, the sensor apparatus comprises a piezoelectric sensor, a piezoresistive sensor, a capacitive sensor and/or a strain gauge. An electrical voltage can be made available with a piezoelectric sensor if a force is applied to said sensor. In the case of a piezoresistive sensor, the electrical resistance of the sensor changes as a function of the force. Furthermore the sensor apparatus can comprise a capacitive sensor which experiences a change in capacitance owing to an effect of a force, for example. With a strain gauge it is possible, for example, to detect a tension and/or a pressure which is applied to the display element or the combiner mirror.

A motor vehicle according to the invention comprises a display device according to the invention. The display device is, in particular, arranged in or on the motor vehicle in such a way that a virtual image or a virtual display can be made available to the driver of the motor vehicle by means of the display device. The motor vehicle is in particular embodied as a passenger car.

A method according to the invention serves to operate a display device for a motor vehicle. In this context, a mirror apparatus which has a display element with a semi-transparent mirror surface is moved between a storage position and a position of use by means of a drive apparatus. In addition, a force applied to the display element is detected by means of a sensor apparatus of the mirror apparatus in the position of use of the mirror apparatus.

The embodiments which are presented with reference to the display device according to the invention and the advantages thereof apply correspondingly to the motor vehicle according to the invention and to the method according to the invention.

Further features in the invention can be found in the claims, the figures and the description of the figures. The features and combinations of features mentioned above in the description and the features and combinations of features mentioned below in the description of the figures and/or shown solely in the figures can be used not only in the respectively specified combination but also in other combinations or alone without departing from the scope of the invention. Embodiments which are not explicitly shown or explained but emerge and can be generated from the explained embodiments by means of separate combinations of features are also as such to be considered as included and disclosed by the invention. Embodiments and combinations of features which therefore do not have all the features of an originally formulated independent claim are also to be considered as disclosed.

The invention will now be explained in more detail on the basis of preferred exemplary embodiments and with reference to the appended drawings, in which:

FIG. 2 shows a display device in a further embodiment, wherein a mirror apparatus of the display device is located in a storage position;

FIG. 3 shows the display device according to FIG. 2, wherein the mirror apparatus is located in a position of use;

Identical and functionally identical elements are provided with the same reference symbols in the figures.

Figure 1:
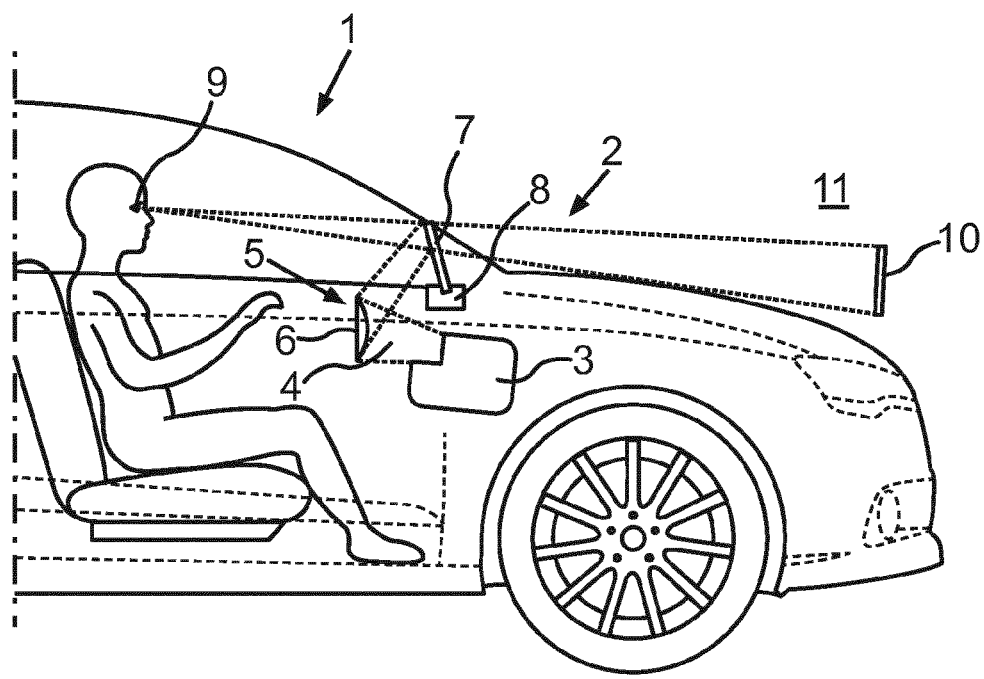
FIG. 1 shows a sectional illustration of a motor vehicle which has a display device according to an embodiment of the present invention.

FIG. 1 shows a sectional illustration of a motor vehicle 1 according to an embodiment of the present invention. The motor vehicle is embodied in the present exemplary embodiment as a passenger car. The motor vehicle 1 comprises a display device 1. The display device 2 is embodied in the present exemplary embodiment as a head-up display device or as a head-up display.

The display device 2 comprises an image-generating apparatus 3. Light can be emitted by means of the image-generating apparatus 3. In particular, an image can be made available with the image-generating apparatus 3. The image-generating apparatus 3 can have, for example, a corresponding screen with which the image can be made available or with which the light 4 can be emitted. Furthermore the display device 2 has an optical apparatus 5. The optical apparatus 5 comprises here a mirror 6. The light 4 which is emitted by the image-generating apparatus 3 is initially incident on the mirror 6 and subsequently on a display element 7. The image-generating apparatus 3 and the optical apparatus 5 are arranged here within a dashboard of the motor vehicle 1.

The display element 7 can also be referred to as a combiner mirror, combiner screen or as a combiner. The display element 7 has a mirror surface and is embodied in a semi-transparent fashion. The display element 7 is formed from a glass or from a plastic. The light 4 which is emitted by the image-generating apparatus 3 is protected onto the display element 7 by means of the optical apparatus 5. In addition, the light 4 which is projected onto the display element 7 is reflected to the eyes 9 of a driver of the motor vehicle 1. Therefore, the light which passes to the eyes 9 of the driver from a surrounding area 11 of the motor vehicle 1 is superimposed with the light which is projected onto the display element 7. A virtual display 10 or a virtual image is therefore produced for the driver of the motor vehicle 1.

FIG. 2 shows the display device 2 in a further embodiment. The display device 2 comprises a housing 12 which can be fabricated, for example, from plastic. In the present exemplary embodiment, the optical apparatus 5 comprises a first mirror 6 and a second mirror 6'. The light 4 which is emitted by the image-generating apparatus 3 can be folded with the first mirror 6 and the light 4 can be projected onto the display element 7 with the second mirror 6' if the display element 7 or a mirror apparatus 13 is located in a position of use.

The display element 7 is part of a mirror apparatus 13 here. The mirror apparatus 13 also comprises a holding element 8 for holding the display element 7 or the combiner mirror. In addition, the mirror apparatus 13 comprises a carrier element 14 which is mechanically connected to the holding element 8. The carrier element 14 is mechanically connected to a drive apparatus 15. The drive apparatus 15 is embodied here as a spindle drive. In this context, the carrier element 14 is mechanically connected to a spindle 16. The spindle can be driven by a motor (not illustrated here) via corresponding gear wheels 17.

FIG. 2 shows the display device 2 in which the mirror apparatus 13 is located in the storage position. The mirror apparatus 13 can be moved from the storage position into the position of use by means of the drive apparatus 15. FIG. 3 shows the display device 2 in which the mirror apparatus 13 is located in the position of use. In the storage position, the display element 7 is located inside the housing 12. In the position of use, the display element 7 is located outside the housing 12. During the movement from the storage position into the position of use the mirror apparatus 13 is moved in a translatory fashion using the drive apparatus 15. Furthermore, the housing 12 has a cover element 18 which is located in a closed position if the mirror apparatus 13 is in the storage position. The cover element 18 is moved into an open position if the mirror apparatus 13 is moved from the storage position into the position of use.

Figure 4:
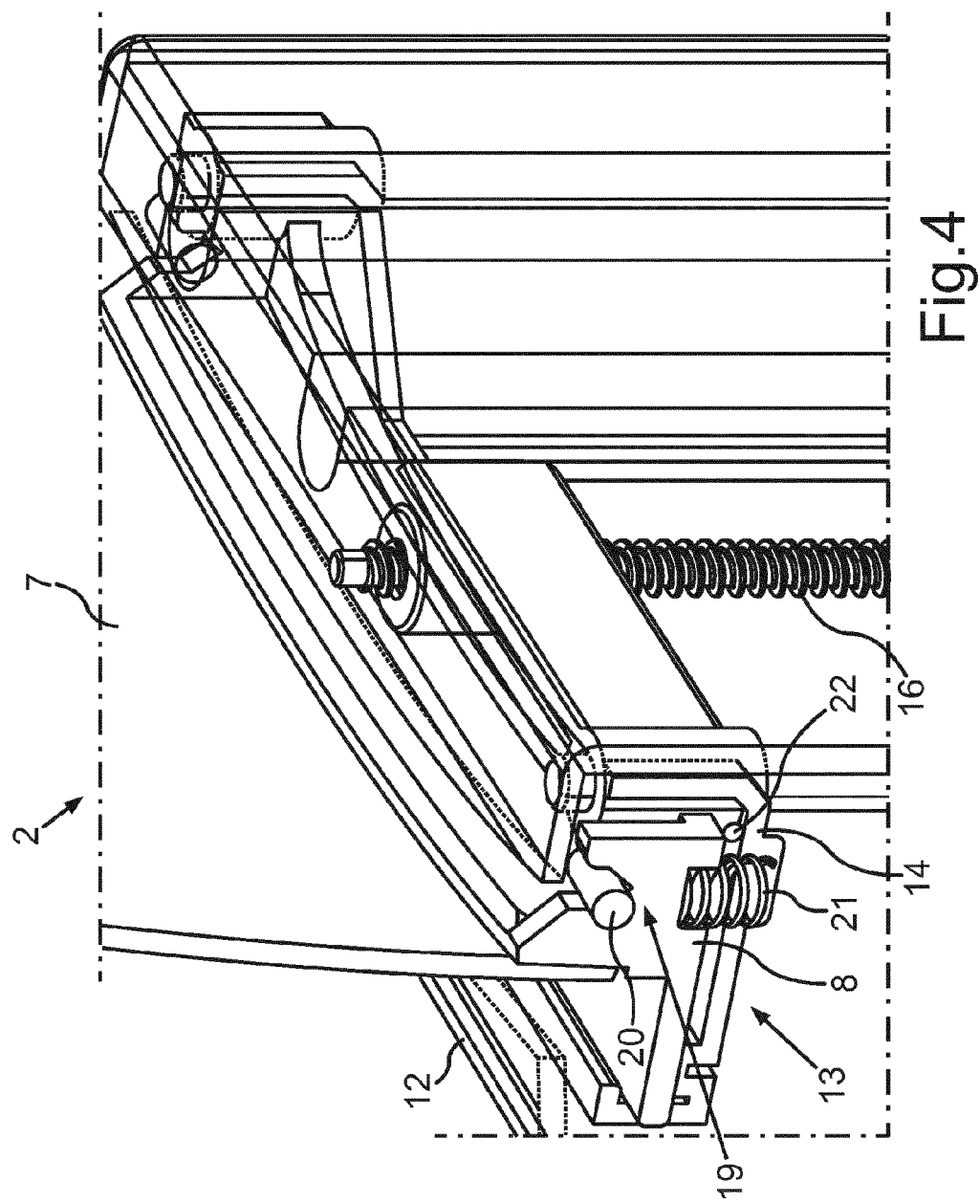
FIG. 4 shows a view of a detail of the display device in FIG. 3.

FIG. 4 shows a view of a detail of the display device 2 wherein the mirror apparatus 13 is located in the position of use. It is apparent here that the mirror apparatus 13 has a bearing element 19. The bearing element 19 is embodied here as a recess within the holding element 8. In addition, the housing 12 has a counter bearing element 20 which corresponds to the bearing element 19. The counter bearing element 20 is embodied here as a bearing bolt which is arranged in a positionally fixed fashion on the housing 12. If the mirror apparatus 13 is moved from the storage position into the position of use by means of the drive apparatus 15, the bearing element 19 abuts against the counter bearing element 20. As a result, the bearing pin is arranged at least partially in the recess. The bearing element 19 and the counter bearing element 20 together form a rotary bearing. Therefore, the display element 7 can be rotated or moved in a rotational fashion in the position of use of the mirror apparatus 13. If a force continues to be applied to the mirror apparatus 13 by means of the drive apparatus 13 after the position of use of the mirror apparatus 13 has been reached, the mirror apparatus 13 is rotated. Therefore, for example the display element 7 can be set to the position of the eyes 9 of the driver.

Furthermore, the mirror apparatus 13 has a spring element 21. The spring element 21 is arranged between the holding element 8 and the carrier element 14. Therefore, it is possible to ensure, on the one hand, that translatory shifting of the carrier element 14 by means of the drive apparatus 15 gives rise to a rotational movement of the display element 7 or of the combiner mirror. The holding element 8 and the carrier element 14 are pre-stressed with respect to one another by means of the spring element 21. Therefore, play between the carrier element 14 and the holding element can be eliminated. Rattling noises during operation of the motor vehicle 1 can therefore be prevented.

Figure 5:
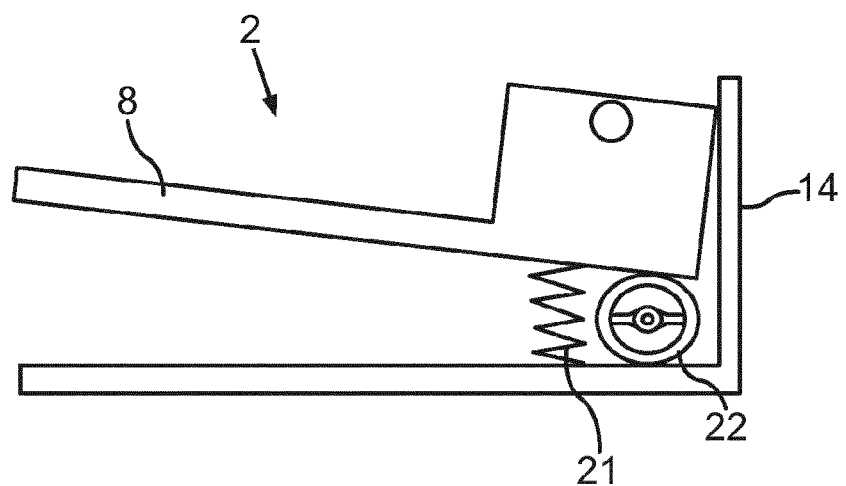
FIG. 5 shows a simplified illustration of the display device according to FIG. 4, wherein the mirror apparatus has a sensor apparatus.

FIG. 5 shows a sectional illustration of the display device 2, wherein the holding element 8 and the carrier element 14 are shown. In addition, the spring element 21 which is arranged between the holding element 8 and the carrier element 14 should be detected. In the present exemplary embodiment, a sensor apparatus 22 is also arranged between the holding element 8 and the carrier element 14. The sensor apparatus 22 is embodied, in particular, as a force sensor. The sensor apparatus 22 can be embodied, for example, as a piezoelectric sensor, as a piezoresistive sensor, as a capacitive sensor or as a strain gauge.

If a force is applied to the display element 7, it is transmitted from the display element 7 to the holding element 8. Therefore, the holding element 8 is moved relative to the carrier element 14. This results in a force being applied to the sensor apparatus 22. This force can be detected by the sensor apparatus 22. As soon as the force exceeds a predetermined threshold value, a control signal can be output with the sensor apparatus 22 and transmitted to the drive apparatus 15. Therefore it is possible, for example, to cause the mirror apparatus 13 to be moved from the position of use into the storage position by means of the drive apparatus 15.

The spring element 21 serves here as a prestressing element and an adjustment element in order to shift the holding element 8, against which the display element 7 is arranged, relative to the carrier element 14. If the mirror apparatus 13 is located, for example, in the position of use and the mirror apparatus 13 is rotated in such a way that it is set to the position of the eyes 9 of the driver, the distance between the holding element 8 and the carrier element 14 is fixed by the spring stress of the spring element 21. The electrical voltage or a resistance value which is output by the sensor apparatus 22 in this reference position can be used as a reference voltage or as a reference resistance. If a pressure is now applied to the display element 7, the electrical voltage and/or the resistance at the sensor apparatus 22 changes.

Furthermore, the sensor apparatus 22 can be used to detect a disturbance of the movement of the mirror apparatus 13 during the movement from the storage position into the position of use and visa versa. Therefore, it is possible to detect, for example, whether the force which is applied to the sensor apparatus 22 is constant during the movement from the storage position into the position of use. If the force increases during the movement, it can be assumed that a fault is present. This is the case, for example if the position of use is not reached and therefore an increase in force occurs in the case of sticking and/or blocking of the mirror apparatus 13.

Figure 6:
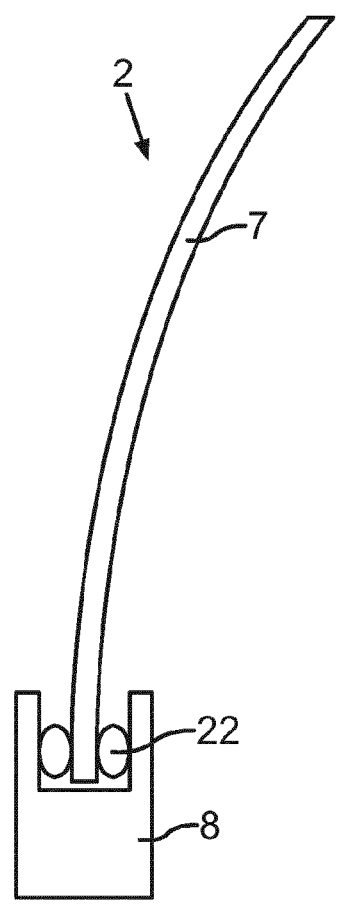
FIG. 6 shows a simplified illustration of a display device with a sensor apparatus in a further embodiment.

FIG. 6 shows a sectional illustration of the drive device 2 in a further embodiment. Here, the sensor apparatus 22 is arranged in an intermediate space between the holding element 8 and the display element 7. The sensor apparatus 22 is therefore attached directly to the mount for the display element 7 or the combiner mirror. As a result of the relatively large lever which the display element 7 has in relation to the holding region of the holding element 7, forces which act on the display element can be reliably detected.

The invention claimed is:

1. A display device for a motor vehicle comprising:
a mirror apparatus which has a display element with a semi-transparent mirror surface; and
a drive apparatus by which the mirror apparatus is moved between a storage position and a position of use,
wherein the mirror apparatus has a sensor apparatus, which is configured to detect, in the position of use of the mirror apparatus, a force applied to the display element.

2. The display device according to claim 1, wherein the sensor apparatus is configured to output a control signal if the detected force exceeds a predetermined threshold value.

3. The display device according to claim 2, wherein the sensor apparatus is configured to transmit the control signal to the drive apparatus, and the drive apparatus is configured to move the mirror apparatus from the position of use into the storage position after reception of the control signal.

4. The display device according to claim 1, wherein the sensor apparatus is configured to detect a force applied to the display element during the movement of the mirror apparatus from the storage position into the position of use.

5. The display device according to claim 1, wherein the mirror apparatus has a holding element for holding the display element and the sensor apparatus is arranged at least partially in an intermediate space between the display element and the holding element.

6. The display device according to claim 1, wherein the mirror apparatus has a carrier element which is connected to the drive apparatus and which is connected to the holding element, wherein the sensor apparatus is arranged at least partially in an intermediate space between the holding element and the carrier element.

7. The display device according to claim 6, wherein the mirror apparatus has a spring element, wherein the holding element is mounted with respect to the carrier element by the prestressed spring element.

8. The display device according to claim 1, wherein the display device has a housing, wherein in the storage position the mirror apparatus is arranged inside the housing, and in the position of use it is arranged at least partially outside the housing.

9. The display device according to claim 8, wherein the mirror apparatus has a bearing element and the housing has a counter bearing element which corresponds to the bearing element, wherein in the position of use of the mirror apparatus the bearing element is mounted rotatably with respect to the counter bearing element.

10. The display device according to claim 1, wherein the drive apparatus is configured to rotate the mirror apparatus in the position of use.

11. The display device according to claim 1, wherein the display device has an image-generating apparatus for emitting light and an optical apparatus for projecting the light emitted by the image-generating apparatus onto the display element.

12. The display device according to claim 1, wherein the sensor apparatus comprises one selected from a group consisting of a piezoelectric sensor, a piezoresistive sensor, a capacitive sensor and a strain gauge.

13. A motor vehicle having a display device according to claim 1.

14. The method for operating a display device for a motor vehicle, comprising:
moving a mirror apparatus, which has a display element with a semi-transparent mirror surface, between a storage position and a position of use by a drive apparatus,
detecting, in the position of use of the mirror apparatus, a force applied to the display element by a sensor apparatus.

* * * * *